United States Patent

Bonnat et al.

[15] 3,661,715

[45] May 9, 1972

[54] PROCESS FOR THE PREPARATION OF PROTEASES ACTIVE IN ALKALINE MEDIUM

[72] Inventors: Roger R. Bonnat, Saint-Gratien; Bernard Ores, Montreuil-Sous-Bois, both of France

[73] Assignee: Roussel-UCLAF, Paris, France

[22] Filed: July 22, 1969

[21] Appl. No.: 843,736

[30] Foreign Application Priority Data

July 22, 1968 France ..................................160344

[52] U.S. Cl. .........................................................195/66 R
[51] Int. Cl. ..............................................................C07g 7/028
[58] Field of Search ..................................195/62, 66, 63, 68

[56] References Cited

UNITED STATES PATENTS 3,519,570  7/1970  McCarty ..........................195/63 UX

OTHER PUBLICATIONS

Tsuru et al. Agr. Biol. Chem. Vol. 30 No. 12 pp. 1261– 1268, 1966.

*Primary Examiner*—Lionel M. Shapiro
*Attorney*—Davis, Hoxie, Faithfull & Hapgood

[57] ABSTRACT

The process comprises fermentating aerobically a Tracy strain of *Bacillus subtilis* in a nutrient medium comprising at least an assimilable carbon source, an assimilable nitrogen source and mineral substances, at a temperature range of about 28° to 40° C, the pH of the medium being adjusted between 7.5 and 9.5, at the beginning of the fermentation, by usual means, then, when the fermentation is over, acidifying the medium until a pH of approximately 4.5 by acetic and/or sulfuric acids, removing insoluble substances from the medium, treating the resulting clarified liquid phase with a mineral salt (for example, ammonium or alkaline sulfates), the pH being then brought close to 8.4 by means of a strong base, leaving the mixture under stirring and at last isolating the resulting precipitate.

The invention concerns also the proteases obtained by the process.

3 Claims, No Drawings

PROCESS FOR THE PREPARATION OF PROTEASES ACTIVE IN ALKALINE MEDIUM

This invention relates to a new process for the preparation of proteases active in alkaline medium and to the products thereof.

It is well known that many microorganisms can elaborate, during their fermentation in various mediums, a large number of enzymatic substances; some of them, generally called proteases, are endowed with more or less important lytic activities upon protein substances. It is also well known that proteases have at present many uses in various fields. They can, for instance, be employed in human therapeutic as well as in the industrial field in cleaning products. For use in laundry products proteases should retain their activity in an alkaline or even very alkaline medium.

Therefore, it is very useful to have a simple and efficient process for preparing such proteases. The present invention relates to a new process for the preparation of proteases active in alkaline medium which comprises fermenting aerobically a Tracy strain of Bacillus subtilis in a nutrient medium comprising at least an assimilable carbon source, an assimilable nitrogen source and mineral substances, the pH of the medium being from 7.5 to 9.5 at the beginning of the fermentation, then, at the completion of the fermentation, removing insoluble substances from the medium, then treating the resulting clarified liquid phase with mineral salts able to salt out proteases of said phase, and finally isolating the obtained precipitate.

In the preferred conditions of carrying out the process according to the present invention, the carbon source used is corn starch and/or potato starch and the nitrogen source is soya flour and/or corn steeps liquor. Mineral elements can be of different kinds, but are mainly constituted by sodium hydrochloride and calcium carbonate. The starting pH of the fermentation medium is, if necessary, advantageously adjusted to about 9. Fermentation is carried out during 25 to 48 hours under intense aeration, over a temperature range of about 28° C. to about 40° C., preferentially close to 36° C.

When fermentation is concluded, insoluble substances are eliminated from the fermentation broth by centrifugation or by filtration. In a preferred non-limiting method according to the invention and in order to improve the quality of the clarified juice, the fermentation medium is acidified at the end of the fermentation until pH of about 4.5, preferentially by acetic or sulfuric acid, or by a mixture of said acids, then the insoluble substances are removed, the clarified juice is collected and subjected to the salting out procedure. If such operations cannot be effected rapidly it is advisable to neutralize the clarified juice to insure the stability of proteases.

The above-mentioned salting out procedure is effected by means of mineral salts, such as, for instance, alkaline sulfates or ammonium sulfate or a mixture of these salts and under definite conditions of pH.

Salting out is advantageously carried out on a clarified acid juice obtained as described before, by adding first to said juice the mineral salt or salts, then by alkalizing the mixture until a pH close to 8.4, under agitation. This salting out procedure can also be effected by alkalizing first the clarified acid juice with a strong base such as sodium hydroxyde until a pH close to 11 is attained, and by adding then mineral salts while keeping the mixture under agitation.

The salting out procedure can also be effected directly on the fermentation broth relieved of its insoluble substances and at the spontaneous pH of the resulting clarified juice.

Small quantities of soluble calcium salts can also be added as stabilizers, whatever conditions of salting out were adopted.

At the completion of the salting out reaction, the resulting precipitate of proteases is separated, generally by centrifugation or draining, operation which leads also to the removing of the main part of salts utilized for the salting out reaction. Then the obtained product can be dried in a drying room under vacuum, or in a fluidized bed.

As an illustration of the preferred conditions above described, the process may be carried out for instance as follows: the nutrient medium is adjusted to a pH of about 9 at the beginning of the fermentation and the fermentation is performed for approximately 30 hours at a temperature of about 37° C.; then, at the completion of the fermentation, the medium is acidified, until a pH of 4.5 ± 0.1 with acetic acid; insoluble substances are then removed from said medium and ammonium sulfate is added to the resulting clarified juice, at a minimum rate of 100 g/l of clarified juice; pH of the mixture is then adjusted to 8.4 ± 0.1 with sodium hydroxyde; the mixture is maintained under a slow agitation for at least 30 minutes and finally, the resulting precipitate is isolated and dried.

Proteases obtained according to the process of the invention have proved to be very stable in aqueous solutions and to own a very high proteolytic activity in alkaline medium. For example, results of tests of stability and proteolytic activity, realized on products obtained under the operative conditions described in example 4 hereinafter, are indicated below.

A. Stability was studied in aqueous solution, on the one hand under different pH values, on the other hand under different temperatures.

Starting from a product owing a definite proteolytic activity, aqueous dilutions of said product containing 5 proteolytic casein units per ml. were prepared. At the end of the test, the resulting proteolytic activity was evaluated with respect to the starting proteolytic activity. The proteolytic activity was always tested according to Kunitz's method (Journ. gen. Physiol. 30, 291, 1947), by reacting the product with casein, the reaction being effected in carbonate buffer (pH 10.5) for 10 minutes at 40° C.

a. Stability with respect to pH

Aqueous solutions, owning the same starting activity, namely 5 proteolytic-casein units per ml., but being at different pH, were maintained for 3 hours at 25° C. Results were reported in the table below.

TABLE I

| Starting pH of the solution | 5 | 6 | 7.5 | 8 | 9 | 10 | 11 | 12 |
|---|---|---|---|---|---|---|---|---|
| % of activity at the end of the test | 90% | 95% | 99% | 99% | 98% | 95% | 90% | 65% |

This table shows that the solutions were stable in a wide range of pH but more particularly between 7.5 and 9.

b. Stability with respect to the temperature

Starting solutions containing 5 proteolytic-casein units per ml. and adjusted by buffer to pH 10.5 were maintained at various temperatures for 10 minutes or for 20 minutes. Results were reported in the Table II below.

TABLE II

| Temperature | 40° | 50° | 60° |
|---|---|---|---|
| % of activity after 10 mn. | 100% | 98% | 66% |
| % of activity after 20 mn. | 98% | 90% | 35% |

This shows that the solutions of enzyme keep their activity at 40° and 50° C.

B. Activity was studied by evaluating the quantity of casein solubilized by a solution containing a determined quantity of the product with respect to the pH, the temperature or the duration of contact.

a. Activity with respect to pH

Titrated solutions of the product, adjusted by buffers to different pH were reacted with casein. After 10 minutes of reaction at 40° C., protein solubilized in the mixture were titrated. It was observed that proteolytic activity was at its maximum at pH 10.5. This maximum activity being evaluated at 100 percent, the results obtained at different pH were expressed in percentage of this activity. The results were as follows:

TABLE III

| pH | 8 | 9 | 10 | 10.5 | 11 | 12 |
|---|---|---|---|---|---|---|
| Proteolytic activity | 60% | 80% | 95% | 100% | 87% | 60% | b. Activity with respect to the temperature

Titrated solutions of the product adjusted to pH 10.5 by buffers, were reacted with casein for 20 minutes at various temperatures. It was observed that the activity was at its maximum at 60° C. This maximum activity being evaluated at 100 percent, the results relating to other temperatures were expressed in percentage of this maximum activity. These results are reported in the Table IV following:

TABLE IV

| Temperature of the reaction | 20° | 40° | 50° | 60° | 70° |
|---|---|---|---|---|---|
| % of activity | 20% | 42% | 74% | 100% | 20% | c. Activity with respect to the duration of contact

Titrated solutions of the product adjusted to pH 10.5 by buffers, were reacted with casein, for various durations. After 20 minutes of reaction, proteolytic activity found was twice the activity found after 10 minutes. But after 60 minutes of reaction, the activity found was only four times the activity found after 10 minutes. Therefore, the activity is proportional to the duration of contact at the beginning of the reaction; but this proportionality disappears later, as it is usual in reactions of enzymatic type.

At last, it was observed that the products themselves were stable at room temperature under usual stocking conditions.

The following non-limiting examples illustrate the invention.

EXAMPLE 1

Starting from a lyophilized *Bacillus/subtilis* v. Tracy strain, a first culture was realized on a gelose medium containing: peptone: 6 g; glucose: 1 g; meat extract: 2 g; yeast extract: 4 g; gelose: 10 g; water s.q. to 1 liter of medium. This first generation was then seeded, with a platinum loop on 55 ml. of culture medium of the following composition: soya flour: 45 g; corn starch: 10 g; calcium carbonate: 5 g; sodium sulfate: 7 g; lard oil: 2.5 g; water s. q. to 1 liter of medium; prior to inoculation, this medium was sterilized by autoclaving for 30 minutes at 121° C. The 55 ml. were poured into a shaking flask of 500 ml. which was, after inoculation, placed on a rotary shaker (220 t/mn and 7 cm. eccentricity); incubation had lasted for 23 to 24 hours at 28° C. ten percent of the resulting culture were then inoculated in a 500 ml. flask containing 34.5 ml. of a medium, hereinafter referred as 343 A medium, and prepared according to the following formula: soya flour: 50 g.; corn steep liquor: 5 g.; starch: 25 g.; sodium chloride: 1.6 g.; calcium carbonate: 6 g.; water s.q. to 1 liter of medium. Prior to inoculation, this preparation was adjusted to pH 9 by sodium hydroxyde, and sterilized by autoclaving for 30 minutes at 121° C. After inoculation, fermentation was performed for 48 hours at 28° C., the flask being placed on a mechanical shaker (220 t/mn, eccentricity 7 cm).

Ten flasks of 500 ml. were prepared as above mentioned; contents of each of them were gathered and there were obtained approximately 300 ml. of medium. Proteolytic activity of this medium was titrated by reacting with casein according to Kunitz's method (Journ. Gen. Physiol. 30, 291, 1947), the reacting being performed at pH 10.5 in presence of a carbonate buffer for 10 minutes at 40° C. There were found 40 casein-proteolytic units per ml. (expressed according to international conventions). The 300 ml. of medium were centrifuged at the spontaneous pH, for 1 hour; 180 g. of ammonium sulfate and 500 mg. of calcium acetate were added to the resulting clarified solution, and the mixture was agitated for 30 minutes, then centrifuged, for 40 hours. The resulting precipitate was separated, collected and dried off under vacuum, to give 2.4 g. of a product titrating 2800 casein-proteolytic units per gram.

EXAMPLE 2

Starting from a preliminary culture obtained on the same medium and under the same conditions as described in example 1, a tank of 20 liters, containing 12 liters of medium 343 A was inoculated at the rate of 7.5 percent v./v. Fermentation was performed for 35 hours at 37° C. under an agitation of 500 t/mn and an aeration of 0.5 liter of air per liter and per minute. When the fermentation was over, the medium contained 25 casein-proteolytic units /ml. It was then acidified at pH 4.5 by 20 percent acetic acid and centrifuged for 1 hour. The supernatent was adjusted to pH 11 with OHNa 5 N, and completed by ammonium sulfate at the rate of 2000 g. of this salt per 10 liters of medium. The mixture was then stirred during 30 minutes and centrifuged for 40 minutes. The resulting precipitate was squeezed off until complete elimination of ammonium sulfate solution and dried under vacuum. Thirty-five g. of product titrating 5,600 casein-proteolytic units per gram were obtained.

EXAMPLE 3

Starting from a preliminary culture obtained on the same medium and under the same conditions as mentioned in example 1, a tank of 2,000 liters containing 600 liters of fermentative medium (medium 343 A) was inoculated at a rate of 7.5 percent in volume of the preliminary culture with respect to the volume of the medium 343 A. Fermentation was carried out for about 30 hours under an agitation of 270 t/mn and under an aeration of 18 m³ of air per hour, at a temperature of 37° C. At the end of the fermentation, the culture medium titrated 34 casein-proteolytic units per ml. Said medium was then acidified at pH 4.5 by 20 percent acetic acid and filtrated. The filtrate was adjusted to pH 11 by OHNa and then completed by technical ammonium sulfate at the rate of 20 kg. of sulfate for 100 l. of filtrate. The mixture was stirred for 30 minutes and centrifuged. The resulting cake was dried off by moderated heating, 2.5 kg. of product were obtained, titrating 7.100 casein-proteolytic units per gram.

EXAMPLE 4

Starting from a preliminary culture obtained on the same medium and under the same conditions as described in Example 1, a tank of 3,000 liters containing 1,000 liters of production medium (medium 343 A) was inoculated at a rate of 7.5 percent in volume of preliminary culture with respect to the volume of the medium 343 A. The fermentation was carried out for 30 hours under an agitation of 270 t/mn, with an aeration of 18 m³ of air per hour and at a temperature of 37° C. When the fermentation was over, the medium of culture titrated about 40 casein-proteolytic units per ml. Said medium was acidified until pH 4.5 by 80 percent acetic acid and filtered. Ammonium sulfate was added to the filtrate at a rate of 200 kg. of product for 1,000 liters of filtrate. The mixture was stirred and, after dissolution of the salt, pH was adjusted to 8.4 ± 0.1 with sodium hydroxyde; the mixture was then maintained under agitation for 1 hour, then centrifuged. The resulting precipitate was collected and dried off at 50° C. in a fluidized bed. Four kg of product titrating 7,000 casein-proteolytic units per gram were obtained.

EXAMPLE 5

Starting, from the first generation of a strain of *Bacillus subtilis* v. Tracy, obtained as described at the beginning of example 1.55 ml. of a culture medium were inoculated with a platinium loop, said medium being prepared according to the following formulation and hereinafter referred as 110 M medium: soya flour: 30 g.; corn starch: 10 g.; calcium carbonate: 5 g.; sodium chloride: 1.6 g.; corn steep liquor: 3 g.; lard oil: 2.5 g.; water s.q. for 1 liter of medium. Prior to inoculation, pH of the medium was adjusted to 7.2 by adding a normal sodim hydroxyde solution, and the medium was sterilized for 30 minutes at 121° C. The 55 ml. of medium, placed in a flask of 500 ml., were then stirred on an alternative shaker (90 periods/minute − 10 cm.) and left for incubation during 21 hours at 28° C. Sixty liters of medium 110 M contained in a fermenter of 100 liters were then inoculated by this preliminary culture at a rate of 0.1 percent in volume. Fermentation was performed for 18 hours at 28° C. under an agitation of 400 t/mn and an aeration of 1 liter of air by liter of medium and per minute. A second preliminary culture was then obtained.

With this second culture and at a rate of 10 percent in volume of culture, 600 liters of production medium, set in a fermenter of 1,000 liters, were inoculated. This production medium had been prepared according to the following formulation: soya flour: 50 g.; corn steep liquor: 5 g.; potato starch: 30 g.; sodium chloride: 1.6 g.; calcim carbonate: 5 g.; water s.q. to 1 liter of medium. pH of this medium was adjusted to 9 by a normal sodium hydroxyde solution and sterilized prior to inoculation. The fermentation was performed for 35 hours, at a temperature of 35° C., under agitation of 270 t/mn and with an aeration of 18 m³ of air per hour. At the completion of the fermentation, the medium of culture titrated about 35 casein-proteolytic units per ml. The culture medium was then completed by 80 percent acetic acid until pH 6, then by 25 percent sulfuric acid until pH of about 4.4. The mixture was filtered, then the resulting filtrate adjusted to pH 11 by a 40 percent sodium hydroxyde solution. Sixty kg. of ammonium sulfate and 60 kg. of sodium sulfate were added to this filtrate, maintained at a temperature of 33° C., under a slow agitation, for 30 minutes, while adjusting pH to 8.5 ± 0.3. The resulting precipitate was ten separated by centrifugation and dried off in vacuum at 50° C. 3.2 kg of product titrating 5,200 casein-proteolytic units per gram were obtained.

What is claimed is:

1. Process for the preparation of proteases active in alkaline medium, which comprises fermentating aerobically a Tracy strain of *Bacillus subtilis* in a nutrient medium comprising at least an assimilable carbon source, an assimilable nitrogen source and mineral substances, at a temperature range of about 28° to 40° C., the pH of the medium being adjusted between 7.5 and 9.5 at the beginning of the fermentation, then, after fermentation, acidifying the medium until a pH of approximately 4.5 by an acid selected from the group consisting of acetic and sulfuric acids, removing insoluble substances from the medium, treating the resulting clarified liquid phase with a mineral salt, adjusting the pH of the clarified liquid phase-mineral salt mass to approximately 8.4 by the addition of a strong base, and continuing to stir the said mass, and subsequently isolating the alkaline-medium active protease precipitate.

2. Process as claimed in claim 1 wherein mineral salts are mineral sulfates selected from the group consisting of alkaline sulfates and ammonium sulfate.

3. Process as claimed in claim 1 wherein the pH is adjusted to approximately 9 at the beginning of the fermentation, then, when the fermentation is over, the medium is acidified to pH 4.5 ± 0.1 by acetic acid, the insoluble substances are removed from the medium, the resulting clarified juice is added with ammonium sulfate at a minimum rate of 100 g/l of clarified juice and the pH of the mixture is then adjusted to 8.4 ± 0.1.

* * * * *